(12) United States Patent
Yang et al.

(10) Patent No.: US 11,773,919 B2
(45) Date of Patent: Oct. 3, 2023

(54) DISCONNECTABLE COUPLING WITH LUBRICATION CONTROL

(71) Applicant: GKN Automotive Limited, Birmingham (GB)

(72) Inventors: Lei Yang, Auburn Hills, MI (US); Christopher M. Zagacki, Auburn Hills, MI (US)

(73) Assignee: GKN Automotive Limited, Birmingham (GB)

( * ) Notice: Subject to any disclaimer, the term of this patent is extended or adjusted under 35 U.S.C. 154(b) by 13 days.

(21) Appl. No.: 17/442,700

(22) PCT Filed: Mar. 26, 2019

(86) PCT No.: PCT/IB2019/000437
§ 371 (c)(1),
(2) Date: Sep. 24, 2021

(87) PCT Pub. No.: WO2020/194020
PCT Pub. Date: Oct. 1, 2020

(65) Prior Publication Data
US 2022/0120322 A1     Apr. 21, 2022

(51) Int. Cl.
*F16D 13/72*     (2006.01)
*F16D 13/74*     (2006.01)
*F16D 13/52*     (2006.01)

(52) U.S. Cl.
CPC .............. *F16D 13/74* (2013.01); *F16D 13/52* (2013.01); *F16D 13/72* (2013.01)

(58) Field of Classification Search
CPC ........... F16D 13/72; F16D 13/74; F16H 57/04
See application file for complete search history.

(56) References Cited

U.S. PATENT DOCUMENTS 2,837,192 A * 6/1958 Dunkelow ............ F16D 25/123
                                                            192/85.41
6,189,669 B1 * 2/2001 Kremer ................. F16D 25/123
                                                            188/71.6
(Continued)

FOREIGN PATENT DOCUMENTS

CN             105473898 A      4/2016
DE     10 2017 216602 A1      3/2019
(Continued)

OTHER PUBLICATIONS

International Search Report and Written Opinion dated Nov. 19, 2019 for PCT/IB2019/000437 (10 pages).

*Primary Examiner* — Ernesto A Suarez
*Assistant Examiner* — Lillian T Nguyen
(74) *Attorney, Agent, or Firm* — Bejin Bieneman PLC (57) ABSTRACT

A disconnectable coupling device rotatable about an axis is provided with a first shaft having an end and a hub formed on the end, the hub including a flange extending radially from the end and a round wall projecting axially from the flange and defining a hollow; a second shaft aligned with the first shaft and opposed to the end of the first shaft, the second shaft having a drum overhanging the hub; a multi-plate clutch held between the hub and the drum to disconnectably connect the hub with the drum; a cup so fixed with the hub as to define a gutter around the first shaft; and one or more perforations axially passing through the flange to establish fluid communication between the gutter and the hollow.

5 Claims, 6 Drawing Sheets

(56) References Cited

U.S. PATENT DOCUMENTS

| | | | |
|---|---|---|---|
| 2001/0011622 A1* | 8/2001 | Arai | F16D 47/00 |
| | | | 192/70.23 |
| 2008/0277232 A1* | 11/2008 | Miyazaki | F16D 25/123 |
| | | | 192/70.12 |
| 2015/0057123 A1* | 2/2015 | Phelps | F16D 13/74 |
| | | | 475/160 |
| 2015/0057124 A1 | 2/2015 | Pump et al. | |
| 2015/0057125 A1 | 2/2015 | Pump et al. | |
| 2016/0091031 A1* | 3/2016 | Nakano | F16D 13/74 |
| | | | 192/70.12 |
| 2017/0089404 A1* | 3/2017 | Ohno | F16D 13/52 |
| 2017/0356535 A1 | 12/2017 | Peura et al. | |
| 2018/0209489 A1* | 7/2018 | Yamaguchi | F16D 25/082 |
| 2018/0231069 A1 | 8/2018 | Hirota et al. | |
| 2018/0238399 A1* | 8/2018 | Yamaguchi | F16D 25/123 |
| 2018/0259006 A1* | 9/2018 | Yamaguchi | F16D 13/52 |

FOREIGN PATENT DOCUMENTS

| | | |
|---|---|---|
| EP | 3184837 A1 | 6/2017 |
| WO | 2017141829 A1 | 8/2017 |
| WO | 2017149829 A1 | 9/2017 |
| WO | 2018031016 A1 | 2/2018 |

* cited by examiner

DISCONNECTABLE COUPLING WITH LUBRICATION CONTROL

CROSS-REFERENCE TO RELATED APPLICATIONS

This application is a national stage of, and claims priority to, Patent Cooperation Treaty Application No. PCT/IB2019/000437, filed on Mar. 26, 2019, which application is hereby incorporated herein by reference in its entirety.

TECHNICAL FIELD

The disclosure herein relates to a disconnectable coupling device with lubrication control applicable to a final drive unit in an AWD vehicle.

BACKGROUND

In an all-wheel drive (AWD) vehicle, a torque generated by an engine and/or an electric motor is transmitted through a transmission to main driving wheels and is partly extracted and transmitted through a power transfer unit (PTU) to other driving wheels. A final drive unit (FDU) receives and distributes the extracted torque to the right and left wheels. A clutch system can be included as part of the FDU or provided as an external device to cut off torque transmission in order to form a part-time or on-demand AWD system. A wet multi-plate clutch is applicable to this clutch system and may be preferable as it allows limited slippage available for absorbing shocks at a time of drive mode changes. PCT Publications WO2018/031016 and WO2017/141829 disclose related arts.

SUMMARY

Wet multi-plate clutches require moderate lubrication because otherwise adhesion or sticking between adjacent plates would occur. The inventors have found typically there is some difficulty in lubrication in a system in which a common housing accommodates both a differential and the multi-plate clutch and rotation of the differential is used for supplying lubricant to all of the accommodated elements. It has been found that the rotation of the differential does spread the lubricant but is not enough to generate a driving force against intervening obstacles such as a partition in the housing. The device described hereinafter addresses this problem.

According to an aspect, a disconnectable coupling device rotatable about an axis is provided with a first shaft having an end and a hub formed on the end, the hub including a flange extending radially from the end, and a round wall projecting axially from the flange and defining a hollow; a second shaft aligned with the first shaft and opposed to the end of the first shaft, the second shaft having a drum overhanging the hub; a multi-plate clutch held between the hub and the drum to disconnectably connect the hub with the drum; a cup so fixed with the hub so as to define a gutter around the first shaft; and one or more perforations axially passing through the flange to establish fluid communication between the gutter and the hollow.

DESCRIPTION

Exemplary embodiments will be described hereinafter with reference to FIG. 1 through FIG. 5.

In these drawings, a reference sign F denotes forward, A aftward, R rightward, and L leftward, respectively. These designations are, however, merely for convenience of explanation, and modified embodiments by interchanging the right and the left, or the front and the rear, are possible.

Figure 1:
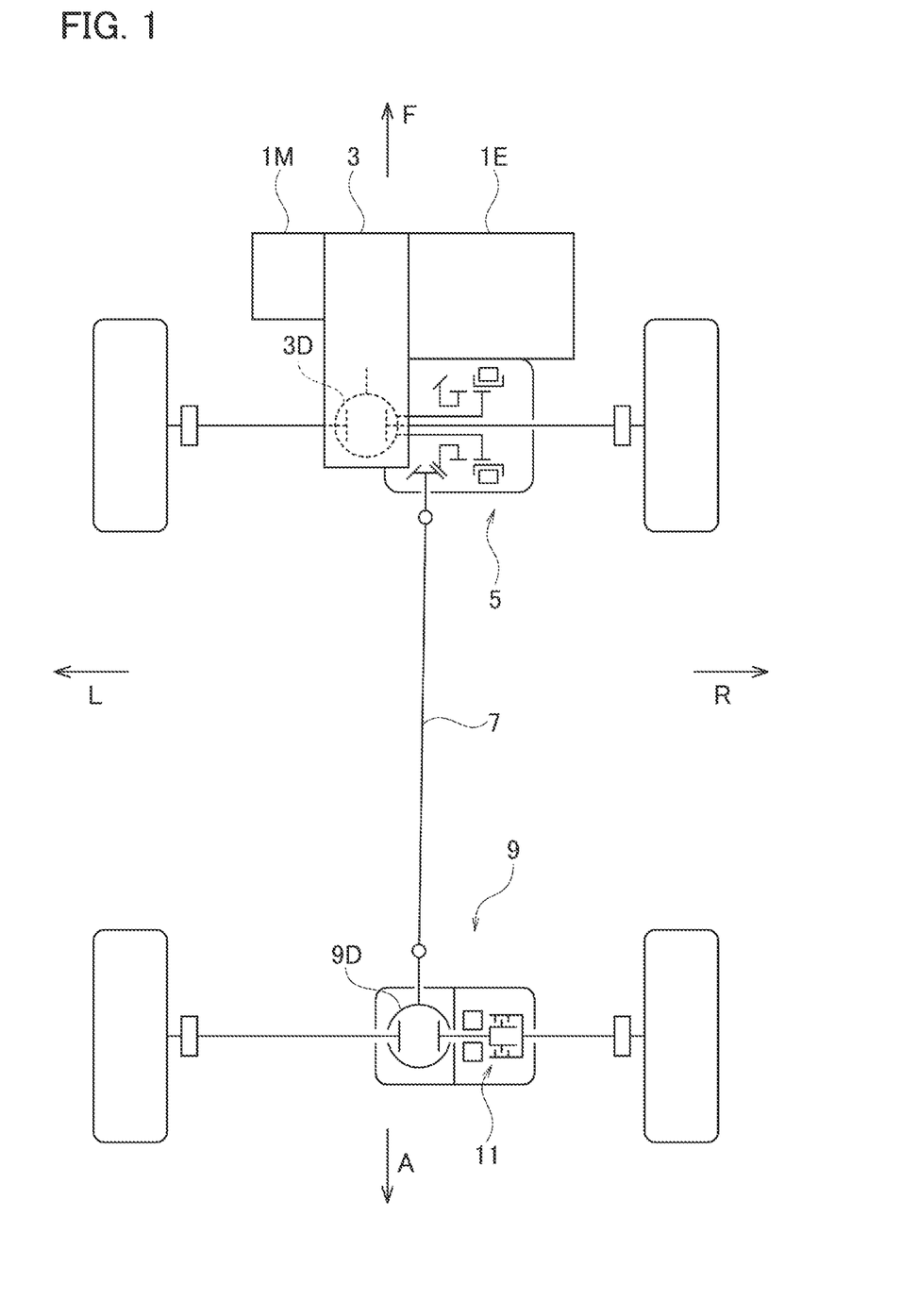
FIG. 1 is a schematic illustration of an AWD vehicle with a final drive unit.

Any disconnectable coupling device disclosed hereinafter could include, without limitation, a vehicle driveline, particularly to a final drive unit (FDU) in an all-wheel drive (AWD) vehicle exemplarily illustrated in FIG. 1. The AWD vehicle is provided with a motor such as a combustion engine 1E and/or an electric motor 1M for generating a torque, a transmission 3 for transmitting the torque to wheels, a power transfer unit (PTU) 5 for extracting the torque in part, a propshaft 7 coupled thereto, and an FDU 9 for receiving and distributing the extracted torque to the other wheels. Both the transmission 3 and the FDU 9 are typically provided with differentials 3D, 9D for apportioning the torque to the right and left wheels while allowing differential motion therebetween.

Figure 2:
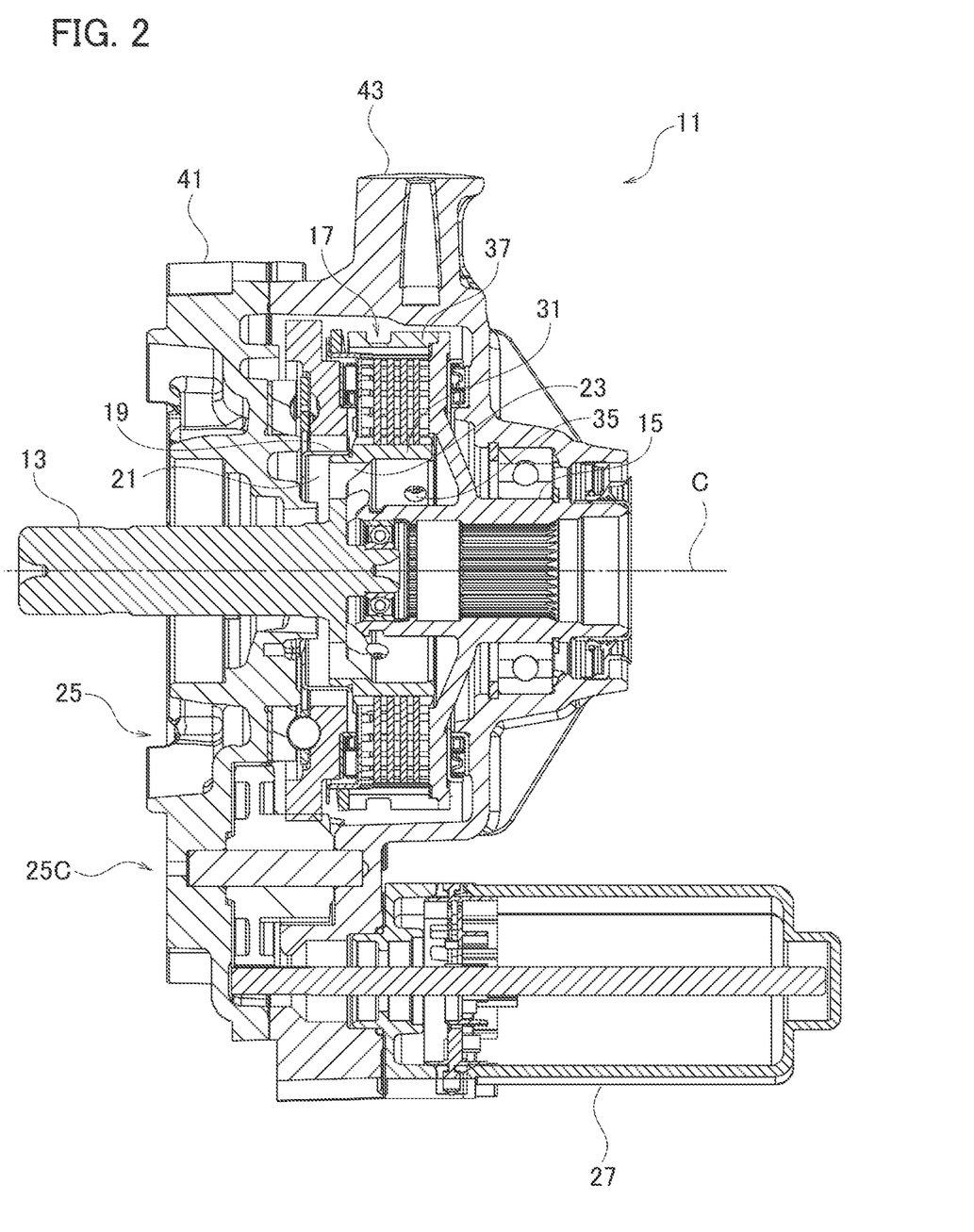
FIG. 2 is a sectional view of a disconnectable coupling device according to an embodiment, which is applicable to the final drive unit.

A disconnectable coupling device 11 of the present embodiment is installed in the FDU 9 and used in combination with the differential 9D. Needless to say, the device 11 may be installed anywhere and used in combination with any device in the vehicle. Referring to FIG. 2 in combination with FIG. 1, a first shaft 13 of the device 11 is coupled with one of side gears of the differential 9D and a second shaft 15 is coupled with one of axles. The device 11 is typically used for controllably cutting off torque transmission between a first shaft 13 and a second shaft 15. When the torque transmission is cut off, the side gear coupled with the first shaft 13 becomes freed from the other side gear. In this situation, the differential 9D does not output the torque to either of the side gears. Thus the vehicle runs in the 2WD mode, whereas otherwise it runs in the AWD mode. The vehicle may be provided with another cut-off device in the PTU 5 in order to stop the propshaft 7 in the 2WD mode.

The disconnectable coupling device 11 is generally provided with a first shaft 13 with a hub 31, a second shaft 15, a multi-plate clutch 17 for disconnectably connecting the first shaft 13 with the second shaft 15, a cup 19 fixed with the hub 31, and an actuator 25 for applying a pressure force on the clutch 17. These elements are carried by a housing typically, but not necessarily, made up of a first portion 41 and a second portion 43, which may further compose a part of a housing of the FDU 9.

The first portion 41 thus partly, but not entirely, obstructs fluid communication between the differential 9D and the device 11. Lubricant spread by the differential 9D mainly flows through a limited space around the first shaft 13 into the device 11. The cup 19 by itself, or in combination with the hub 31, defines a gutter 21 for collecting and guiding a considerable amount of lubricant from the first shaft 13 through the inside of the hub 31 to the multi-plate clutch 17. Details of the cup 19 and the gutter 21 will be described later.

The first shaft 13 is a shaft rotatable about a rotational axis C. The first shaft 13 is led out, i.e., extends, through an opening in the first portion 41 toward the differential 9D, and around its led-out end any structure can be formed for linking with the differential 9D, such as splines. There may be some space between the first shaft 13 and the opening on the first portion 41, as described already.

Figure 3:
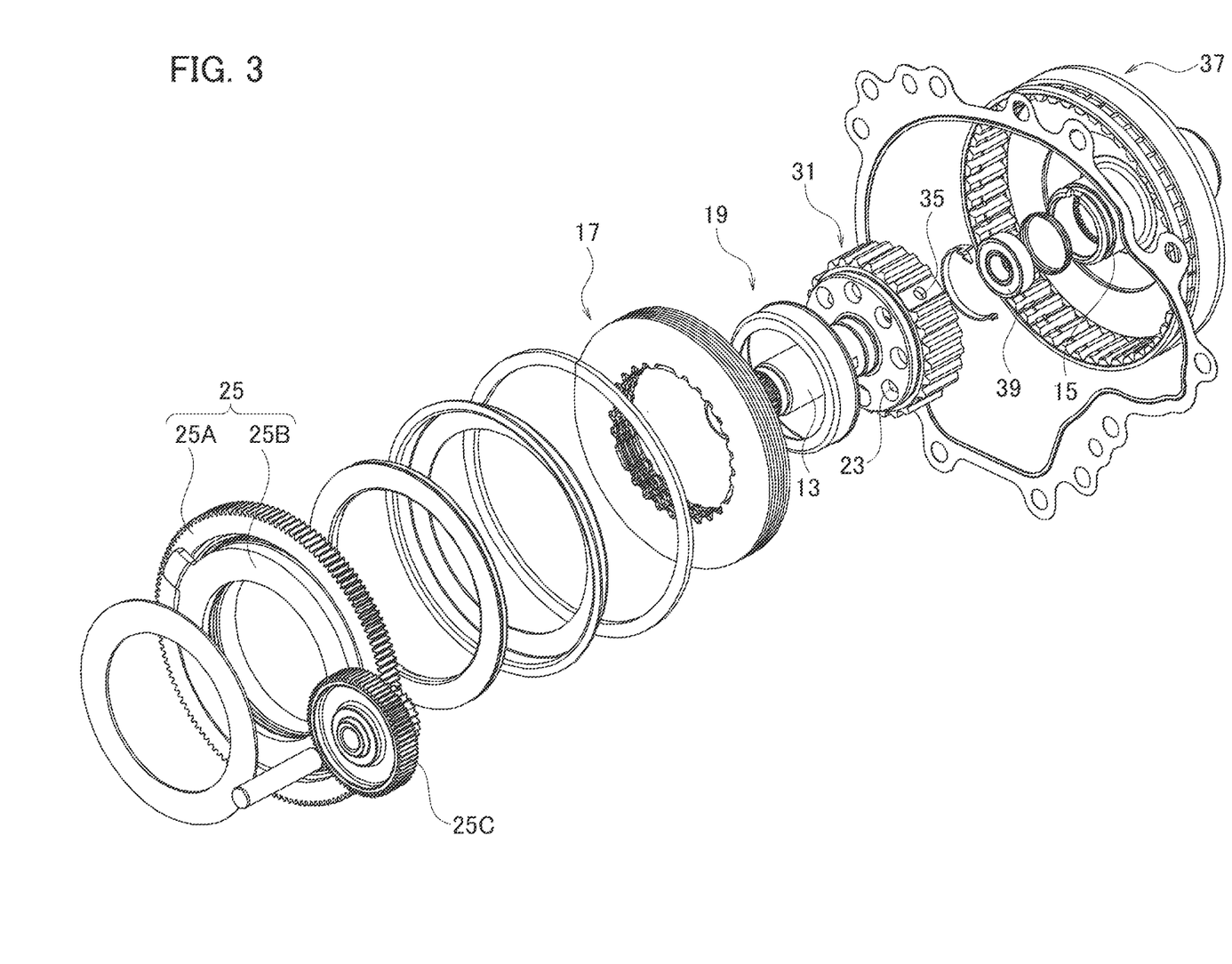
FIG. 3 is an exploded perspective view of components in the disconnectable coupling device.
Figure 4:
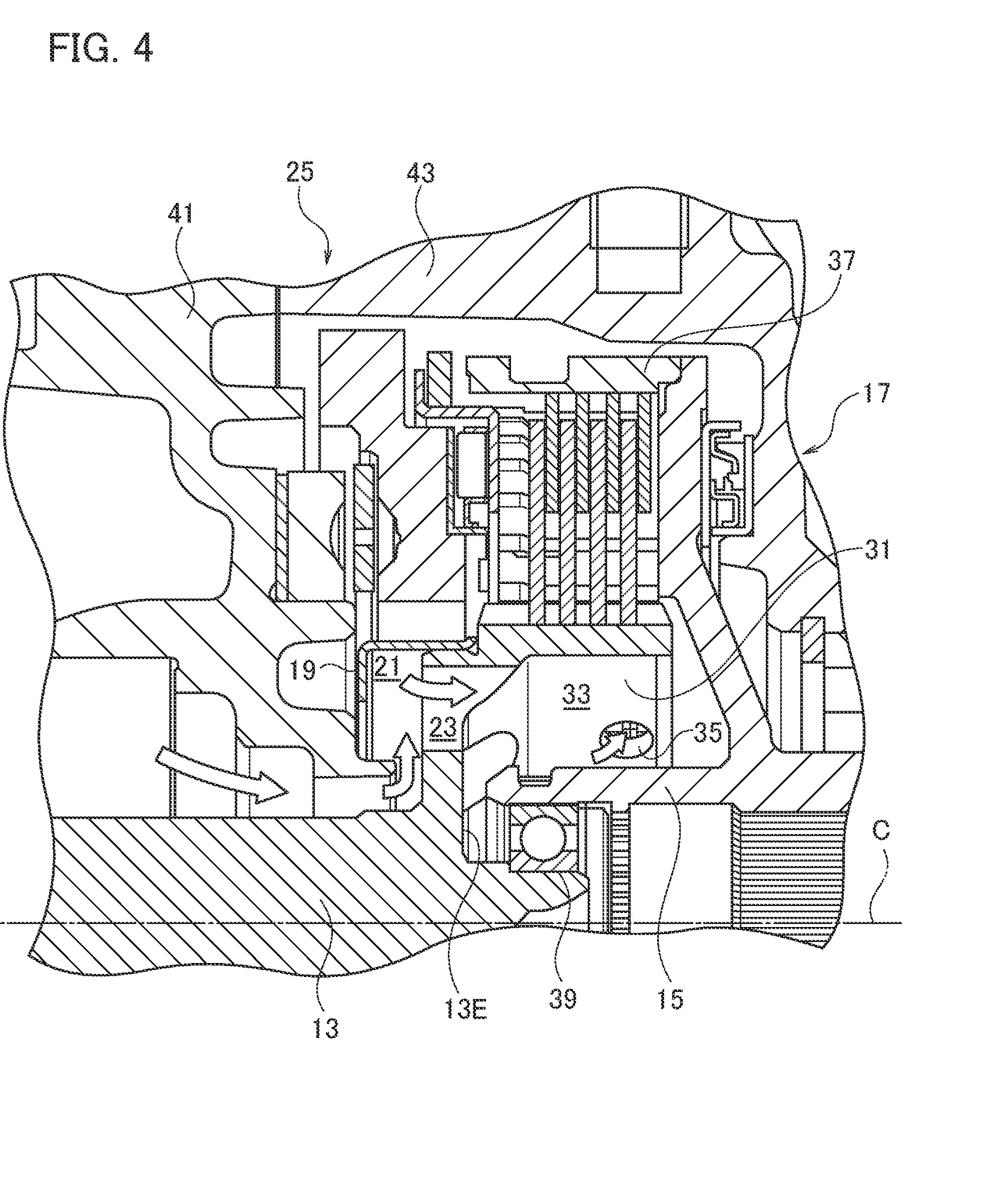
FIG. 4 is an enlarged sectional view of the disconnectable coupling device with a schematic illustration of lubricant flows.

Referring to FIGS. 3 and 4 in combination with FIG. 2, the hub 31, serving as an internal structure of the clutch 17, is formed on another end 13E of the first shaft 13. While various forms are applicable, the hub 31 may be formed in a stockpot-like shape for instance. The hub 31 axially projects beyond the end 13E of the first shaft 13 toward the second shaft 15. More specifically, referring further to FIG. 5, the hub 31 is provided with a flange 31F extending radially from the end 13E and a round wall 31W projecting axially from the flange 31F so that the wall 31W and the flange 31F define a hollow 33. An outer periphery of the wall 31W has any structure such as keys or lugs for engaging with inner plates of the multi-plate clutch 17.

Figure 5:
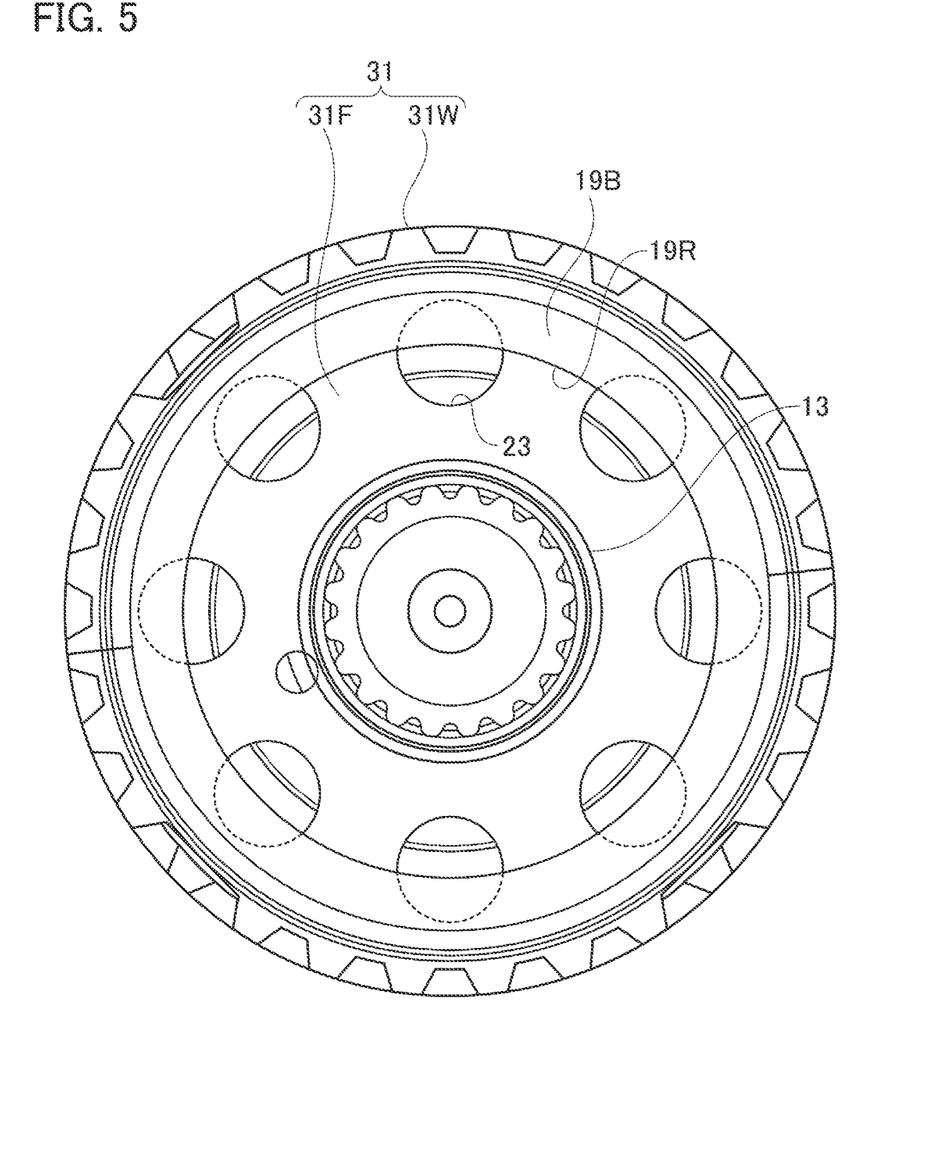
FIG. 5 is a side view of the first shaft and the cup fixed therewith.

The structure as described above is beneficial in forming the first shaft 13 and the hub 31 in a unitary body by casting, forging, cutting out from a bulk ingot, or any suitable forming method. The first shaft 13 and the hub 31 may be nonetheless formed in separate bodies and thereafter unitized by engaging, press-fitting, welding or any unitization method.

The hub 31 may have any structure such as openings for allowing the lubricant to flow from around the first shaft 13 into the multi-plate clutch 17. FIGS. 3 and 4 illustrate an example thereof, in which one or more perforations 23 axially pass through the flange 31F, which establish fluid communication from around the first shaft 13 to the hollow 33 defined by the hub 31. In the same example, one or more through-holes radially pass through the wall 31W, which establish fluid communication between the hollow 33 and the multi-plate clutch 17.

Referring again to FIGS. 2 and 3, the second shaft 15 is also rotatable about the axis C and is axially aligned with and opposed to the first shaft 13. The second shaft 15 may be rotatably supported via a ball bearing by the second portion 43. Further, in between the first shaft 13 and the second shaft 15, a ball bearing 39 may be interposed in order to rotatably support the first shaft 13.

The second shaft 15 may be formed as a tubular structure and the interior thereof may have any structure such as splines for linking with an axle or a shaft to the axle. A flange radially projects from the shaft 15 exterior, and a drum 37 is fixed or formed as a unitary, i.e., single, part with the flange. The drum 37 overhangs the hub 31 and thereby forms an external structure of the clutch 17. The inner periphery of the drum 37 has any structure such as keys or lugs for engaging with outer plates of the multi-plate clutch 17.

Inner and outer plates of the clutch 17 are alternately arranged and are respectively engaged with the lugs of the hub 31 and the drum 37. The multi-plate clutch 17 is thereby held between the hub 31 and the drum 37. When a sufficient thrust force is applied thereto, the clutch 17 connects the hub 31 with the drum 37 and then transmits the torque from the first shaft 13 to the second shaft 15.

The actuator 25 is a device for exerting the thrust force on the multi-plate clutch 17. Applicable devices include, without limitation, a hydraulic actuator, a pneumatic actuator, an electromagnetic actuator, and a cam mechanism 25 as illustrated in FIGS. 2 and 3.

The cam mechanism 25 is a device for converting a torque into a thrust force. The cam mechanism 25, as best understood from FIGS. 2 and 3, may be provided with relatively rotatable plates 25A, 25B, cam pieces such as cam balls put therebetween, and an electric motor 27 for rotating the plate 25A. The cam mechanism 25 may include a reduction gear 25C for multiplying force by the motor 27. One or both of the plates 25A, 25B have circumferentially extending slopes and the cam balls are capable of rolling on these slopes. When the plate 25A is rotated by the motor 27, the cam balls roll on and go up the slopes, thereby pressing the plate 25A toward the clutch 17.

The cup 19 may be formed in a relatively broad and shallow cup-like or pan-like shape with an opened bottom 19B, as best seen in FIGS. 2 and 5. More specifically, the cup 19 may have a radial outer wall and the bottom 19B that projects radially inwardly from the outer wall and leaves an opening. Such a simple structure is beneficial in allowing cost-efficient production, whereas the cup may additionally include some other structures such as an internal rib for defining the gutter 21 or assisting lubricant flow to and from the gutter 21.

The outer wall of the cup 19 is fitted on or fixed with the hub 31, particularly on the outer periphery of the flange 31F and/or its wall 31W for instance. The outer wall extends in the direction opposite to the wall 31W relative to the flange 31F and the first shaft 13 passes through the opening of the bottom 19B. The fitting or fixation may be created by press-fitting, and correspondingly the wall 31W may include a stepwise narrowed portion to receive the fitted-on cup 19 as shown in FIG. 4. These structural measures are beneficial in cost efficiency in production and also allow sufficient freedom of design, particularly about the arrangement and the dimensions of the hub 31 and the perforations 23. The cup 19 alone, or in combination with the flange of the hub 31, defines the gutter 21 encircling the first shaft 13.

FIG. 4 schematically illustrates by a series of arrows the lubricant flow in the device 11 particularly around the gutter 21 and the hollow 33. When the device 11 rotates, the lubricant spread by the rotating differential 9D flows along the first shaft 13 and can pass through the opening of the first portion 41. The centrifugal force exerted by the rotating first shaft 13 turns the lubricant radially outward and the gutter 21 encircling the first shaft 13 can collect a considerable amount of the lubricant.

Figure 6:
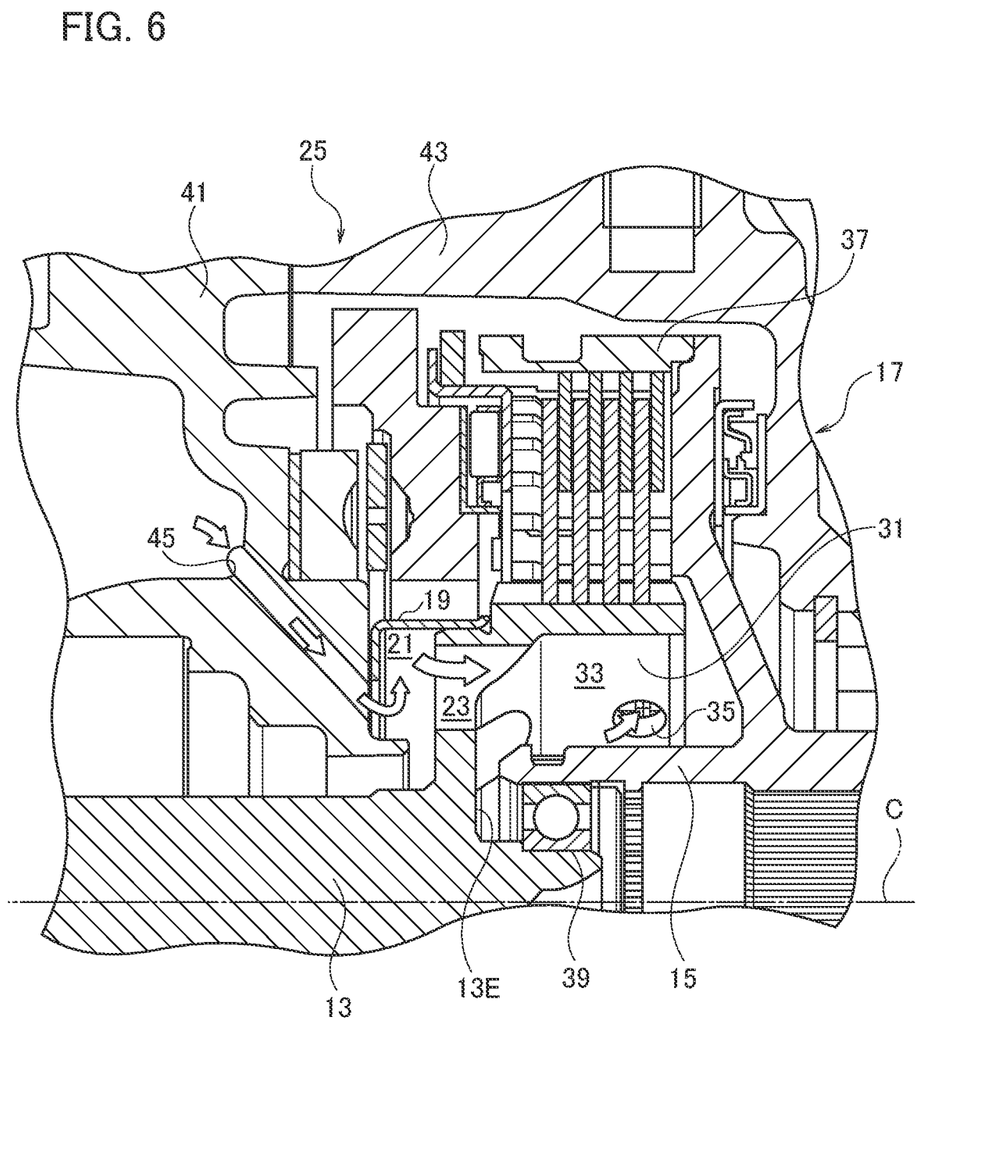
FIG. 6 is an enlarged sectional view of a disconnectable coupling device according to another embodiment.

The device 11 may, although does not necessarily, have another lubricant pathway. One example thereof is a passage 45 as shown in FIG. 6, which passes through the first portion 41 to establish fluid communication between the cavity for the differential 9D and the cavity for the device 11. An entrance of the passage 45 may be exposed to the outer periphery of the differential 9D or in communication with the oil gutter therefor to collect the lubricant spread by the differential 9D. Instead, or in addition, the passage 45 may be connected to the motor 27 or the reduction gear 25C to use its driving force for feeding the lubricant. An exit of the passage 45 may be directed to the gutter 21. The lubricant supplied by the differential 9D mainly, or in parallel with the flow along the first shaft 13, flows through the passage 45 and flows in the gutter 21 as illustrated by the white arrows in FIG. 6.

In any of these cases, the gutter 21 pools a considerable amount of the lubricant therein and the rotating cup 19 in turn exerts a centrifugal force on the pooled lubricant but dams it radially, thereby creating an axial driving force that urges the lubricant to flow beyond the adjacent perforations 23 into the hollow 33.

To pool a sufficient amount of the lubricant and/or promote the axial flow toward the perforations 23, as shown in FIG. 5, the height of the rim 19R of the opened bottom 19B from the outer wall is preferably made sufficiently high as compared with bottoms of the perforations 23. Or, the perforations 23 are preferably disposed at least partly radially outwardly beyond the rim 19R.

Referring again to FIG. 4, as long as the device 11 keeps rotating, the lubricant in the hollow 33 receives a centrifugal force again and thereby flows through the through-holes 35, and/or any gap between the hub 31 and the drum 37, into the multi-plate clutch 17. The lubricant thus provides sufficient lubrication for the clutch 17.

In contrast, when the device 11, particularly the first shaft 13, stops rotating, the lubricant supply would concurrently halt as the centrifugal forces no longer act thereon. This is beneficial in getting the clutch 17 connected because excessive lubricant would not intrude into the mutually parted clutch plates. It is additionally noted that disconnection of the clutch 17 and suspension of rotation of the first shaft 13 would concurrently occur particularly in a case where the PTU 5 includes the cut-off device to stop the propshaft 7 as described earlier. The device disclosed herein thus provides necessary and sufficient lubrication control automatically.

It is additionally noted that, absent the structures described above, the hollow 33 might be hardly usable as a main route for the lubricant because the hollow 33 is hidden behind the hub 31 and the drum 37 but the above embodiments can impel a sufficient amount of the lubricant through the perforations 23 and use centrifugal force in the hollow 33 for feeding the lubricant to the clutch 17.

Although certain exemplary embodiments are described above, modifications and variations of the embodiments will occur to those skilled in the art, in light of the above teachings.

What is claimed is:

1. A disconnectable coupling device rotatable about an axis, comprising:
    a first shaft having an end and a hub formed on the end, the hub including a flange extending radially from the end and a round wall projecting axially from the flange and defining a hollow;
    a second shaft aligned with the first shaft and opposed to the end of the first shaft, the second shaft having a drum overhanging the hub;
    a multi-plate clutch held between the hub and the drum to disconnectably connect the hub with the drum;
    a cup fixed with the hub so as to define a gutter around the first shaft;
    a housing defining an opening so dimensioned as to leave a space around the first shaft to establish fluid communication from outside the housing through the space to the gutter in the housing; and
    one or more perforations axially passing through the flange to establish fluid communication between the gutter and the hollow,
    wherein the cup includes a radially outer wall and a bottom radially inwardly projecting from the outer wall and leaving an opening through which the first shaft passes so that the flange of the hub, the outer wall and the bottom in combination define the gutter,
    wherein the perforations are disposed at least partly radially outwardly beyond a rim of the opening defined by the cup.

2. The device of claim 1, further comprising:
    one or more through-holes radially passing through the hub to establish fluid communication between the hollow and the multi-plate clutch.

3. The device of claim 1, wherein the hub axially projects beyond the end of the first shaft toward the second shaft.

4. The device of claim 1, wherein the cup fits on an outer periphery of the hub.

5. The device of claim 1, further comprising:
    a fluid passage passing through the housing and directed to the gutter.

* * * * *